(12) United States Patent
Driant et al.

(10) Patent No.: US 8,985,261 B2
(45) Date of Patent: Mar. 24, 2015

(54) ENGINE SUPPORTING STRUCTURE FOR WORKING VEHICLE

(71) Applicant: Yanmar Co., Ltd., Osaka-shi, Osaka (JP)

(72) Inventors: Mathieu Driant, Saint-Dizier Cedex (FR); Christophe Caboret, Saint-Dizier Cedex (FR)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 14/223,825

(22) Filed: Mar. 24, 2014

(65) Prior Publication Data
US 2014/0305724 A1    Oct. 16, 2014

(30) Foreign Application Priority Data

Apr. 11, 2013   (EP) ...................................... 13305471

(51) Int. Cl.
*B60K 5/12*      (2006.01)
*E02F 9/08*      (2006.01)
*B60K 11/04*     (2006.01)

(52) U.S. Cl.
CPC ................. *B60K 5/12* (2013.01); *E02F 9/0866* (2013.01); *B60K 11/04* (2013.01); *B60Y 2200/412* (2013.01)
USPC ........................................ 180/299; 180/300

(58) Field of Classification Search
CPC ....... B60K 5/12; B60K 5/1208; B60K 5/1216
USPC .......................................... 180/291, 299, 300
See application file for complete search history.

(56) References Cited

U.S. PATENT DOCUMENTS

| | | | |
|---|---|---|---|
| 6,651,768 B2* | 11/2003 | Fournier et al. | 180/228 |
| 7,828,097 B2* | 11/2010 | Kondou et al. | 180/68.1 |
| 8,397,856 B2* | 3/2013 | Gruen et al. | 180/291 |
| 2009/0199792 A1 | 8/2009 | Kondou et al. | |
| 2010/0237220 A1 | 9/2010 | Grun et al. | |

FOREIGN PATENT DOCUMENTS

| | | |
|---|---|---|
| JP | S60-25809 A | 2/1985 |
| JP | S60-78876 A | 5/1985 |
| JP | H05-147444 A | 6/1993 |
| JP | 2006-137205 A | 6/2006 |
| JP | 2007-055280 A | 3/2007 |
| WO | WO2007/004327 A | 1/2007 |

OTHER PUBLICATIONS

The EESR for related European Appl. No. 13305471.8, European Patent Office, mailed on Aug. 29, 2013, 5 pgs.

* cited by examiner

*Primary Examiner* — John Walters
(74) *Attorney, Agent, or Firm* — Sterne, Kessler, Goldstein & Fox P.L.L.C.

(57) ABSTRACT

It is an object of the present invention to provide an engine supporting structure for a working vehicle that can realize the simplification of manufacturing processes and the reduction of costs. With respect to an engine supporting structure for a working vehicle (backhoe) that includes an engine and a plurality of engine mounts to support the engine, the engine supporting structure includes one piece of mount plate to support the plurality of engine mounts, wherein the mount plate is supported by a stand having a skin-stressed sheet-metal body construction, surrounding with beams welded to the left and right end portions of the mount plate, and with beams welded to the anterior and posterior end portions of the mount plate.

2 Claims, 10 Drawing Sheets

Prior Art

ENGINE SUPPORTING STRUCTURE FOR WORKING VEHICLE

CROSS-REFERENCE TO RELATED APPLICATIONS

The present application claims priority to European Patent Application No. 13305471.8, filed on Apr. 11, 2013, the disclosure of which is incorporated herein in its entirety by reference thereto.

BACKGROUND OF THE INVENTION

1. Field of the Invention

The present invention relates to a technology of an engine supporting structure for a working vehicle.

2. Background Art

Conventionally, a construction equipment vehicle typified by a backhoe and an agricultural equipment vehicle typified by a tractor have been known. These working vehicles are equipped with an engine and operated by the motive power of the engine. For example, the backhoe travels based on the motive power of the engine and carries out an excavating operation based on the motive power of the engine (for example, see WO2007/004327).

Incidentally, the engine of the working vehicle is supported by a plurality of engine mounts. Then, each engine mount is supported by a corresponding mount base. That is, the engine of the working vehicle is supported by the plurality of engine mounts and the plurality of mount bases (for example, see Japanese Unexamined Patent Application Publication No. 1993 147444).

Herein, as is illustrated in FIG. 10, a structure in which an engine E is supported by four sets of engine mounts M and four sets of mount bases B is assumed. Each mount base B is welded to a frame F. In the case of this structure, each mount base B is required to be welded at an appropriate position while being kept at an appropriate angle. Accordingly, there has been a problem in that a welding operation along with jigs is essential, and manufacturing processes are complicated. Further, there has been a problem in that the number of components increases, and production costs are high.

BRIEF SUMMARY OF THE INVENTION

It is an object of the present invention to provide an engine supporting structure for a working vehicle that can realize the simplification of manufacturing processes and the reduction of costs.

The problems to be solved by the present invention have been described hereinabove, and subsequently, the means of solving the problems will be described below.

That is, according to one embodiment of the present invention, an engine supporting structure for a working vehicle may be configured to support an engine with a plurality of engine mounts, and the engine supporting structure may include one piece of mount plate configured to support the plurality of engine mounts, and wherein the mount plate is supported by a stand having a skin-stressed sheet-metal body construction, surrounding with beams welded to the left and right end portions of the mount plate, and with beams welded to the anterior and posterior end portions of the mount plate.

According one embodiment of the present invention, with respect to the engine supporting structure, a radiator configured to radiate heat of engine coolant, and wherein the mount plate supports the engine and the radiator.

Effects of the Invention

The embodiments of the present invention provide the following advantageous effects.

According to one embodiment of the present invention, the engine supporting structure includes one piece of mount plate to support the plurality of engine mounts. Then, the mount plate may be supported by a stand having a skin-stressed sheet-metal body construction (monocoque construction). Accordingly, the wall surfaces of the stand disperse the stress, so that the bending rigidity of the mount plate can be improved.

According one embodiment of the present invention, the mount plate supports the engine and the radiator. Accordingly, this eliminates the structure to support the radiator separately, so that the simplification of the manufacturing process and the reduction in costs can be achieved.

BRIEF DESCRIPTION OF THE DRAWINGS/FIGURES

DETAILED DESCRIPTION OF THE INVENTION

First, the entire configuration of a backhoe 100, which is a working vehicle, will be described. It is noted that the technological concept of the present invention is not limited to the backhoe 100 described below, but can generally be applied to working vehicles such as a construction equipment vehicle and an agricultural equipment vehicle.

Figure 1:
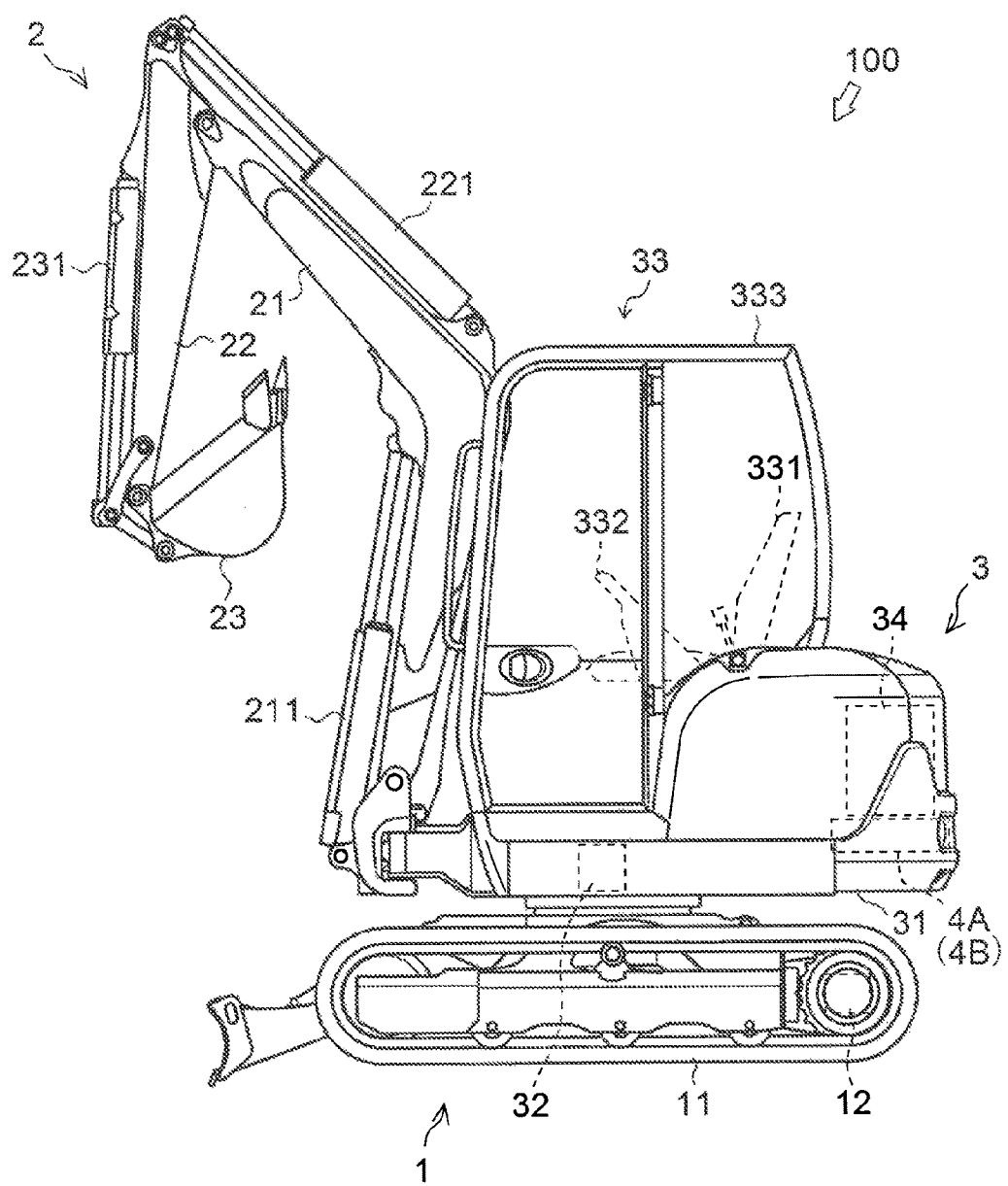
FIG. 1 is a diagram illustrating the entire configuration of a backhoe.

FIG. 1 is a diagram illustrating the entire configuration of the backhoe 100. It is noted that an arrow F illustrated in the diagram represents the advancing direction of the backhoe 100.

As is illustrated in FIG. 1, the backhoe 100 is mainly constituted by a traveling apparatus 1, a working apparatus 2, and a rotation apparatus 3.

The traveling apparatus 1 allows the backhoe 100 to travel. The traveling apparatus 1 is constituted by a symmetrical pair of crawlers 11, a hydraulic motor 12, and the like. The traveling apparatus 1 allows the backhoe 100 to advance forward and backward by means of the left-and-right crawlers 11 driven by the hydraulic motor 12. Also, the traveling apparatus 1 allows the backhoe 100 to rotate by means of the left-and-right crawlers 11 independently driven by the hydraulic motor 12.

The working apparatus 2 is aimed at carrying out the operation of excavating earth and sand. The working apparatus 2 is constituted by a boom 21, an arm 22, a bucket 23, and the like. The working apparatus 2 drives these devices, which makes it possible to carry out the excavating operation.

To be more specific, the boom 21, whose one end portion is supported at the anterior portion of the rotation apparatus 3, is rotated by a movably retractable boom cylinder 211. Also, the arm 22, whose one end portion is supported by the other end portion of the boom 21, is rotated by a movably retractable arm cylinder 221. Then, the bucket 23, whose one end portion is supported by the other end portion of the arm 22, is rotated by a movably retractable bucket cylinder 231. That is, the working apparatus 2 has a multiple joint structure including rotating portions disposed at three locations. Thus, the working apparatus 2 drives these portions simultaneously or independently with each other, which makes it possible to carry out the excavating operation.

The rotation apparatus 3 is aimed at rotating the working apparatus 2. The rotation apparatus 3 is constituted by a rotation platform 31, a hydraulic motor 32, and the like. Regarding the rotation apparatus 3, the hydraulic motor 32 drives the rotation platform 31, which makes the working apparatus 2 rotatable. Also, an engine 34 is disposed in the rotation apparatus 3, in addition to an operating portion 33.

To be more specific, in the operating portion 33, an operating seat 331 and various operating devices 332 are provided. Then, the operating seat 331 and various operating devices 332 are covered by a cabin 333. An operator operates the operating devices 332 in a state where the operator stays seated at the operating seat 331 and carries out the control of the engine 34. Also, the operator operates the operating devices 332 and carries out the control of each of motors 12 and 32, and each of cylinders 211, 221, and 231. Thus, the operator operates the backhoe 100.

Figure 2:
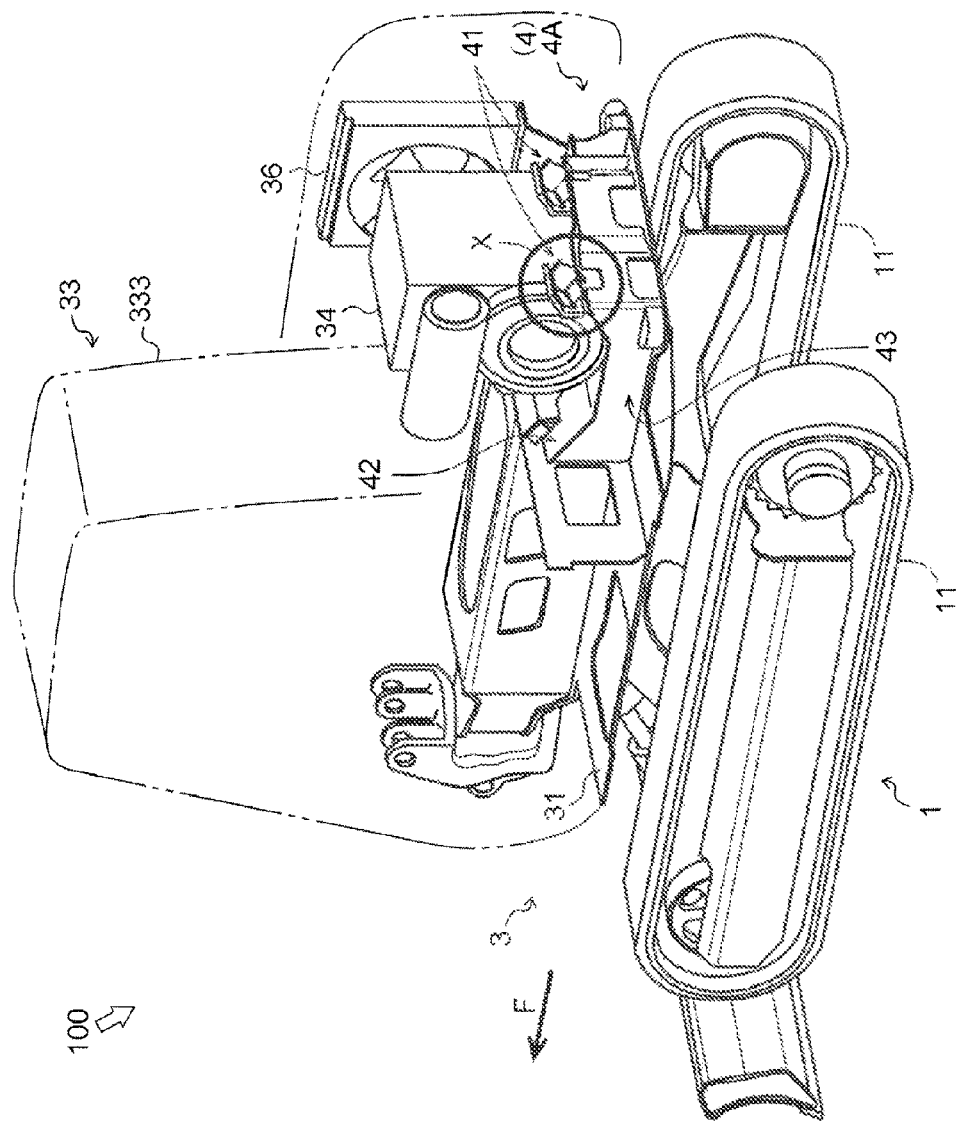
FIG. 2 is a diagram illustrating an engine supporting structure according to a first embodiment of the present invention.

Further, an engine supporting structure 4 is provided in the rotation apparatus 3 (see FIG. 2). In the backhoe 100, the engine supporting structure 4 is provided on the posterior upper portion of the rotation platform 31. Then, the engine 34 is supported based on the engine supporting structure 4.

Hereinafter, the engine supporting structure 4 (hereinafter referred to as "engine supporting structure 4A") according to the first embodiment of the present invention will be described in detail.

Figure 3:
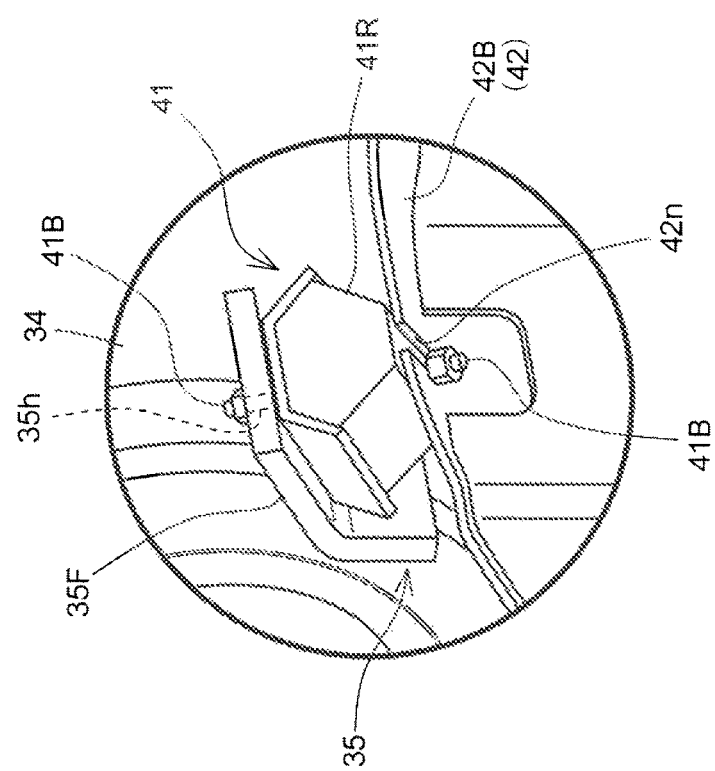
FIG. 3 is an enlarged view of an area X of FIG. 2.
Figure 4:
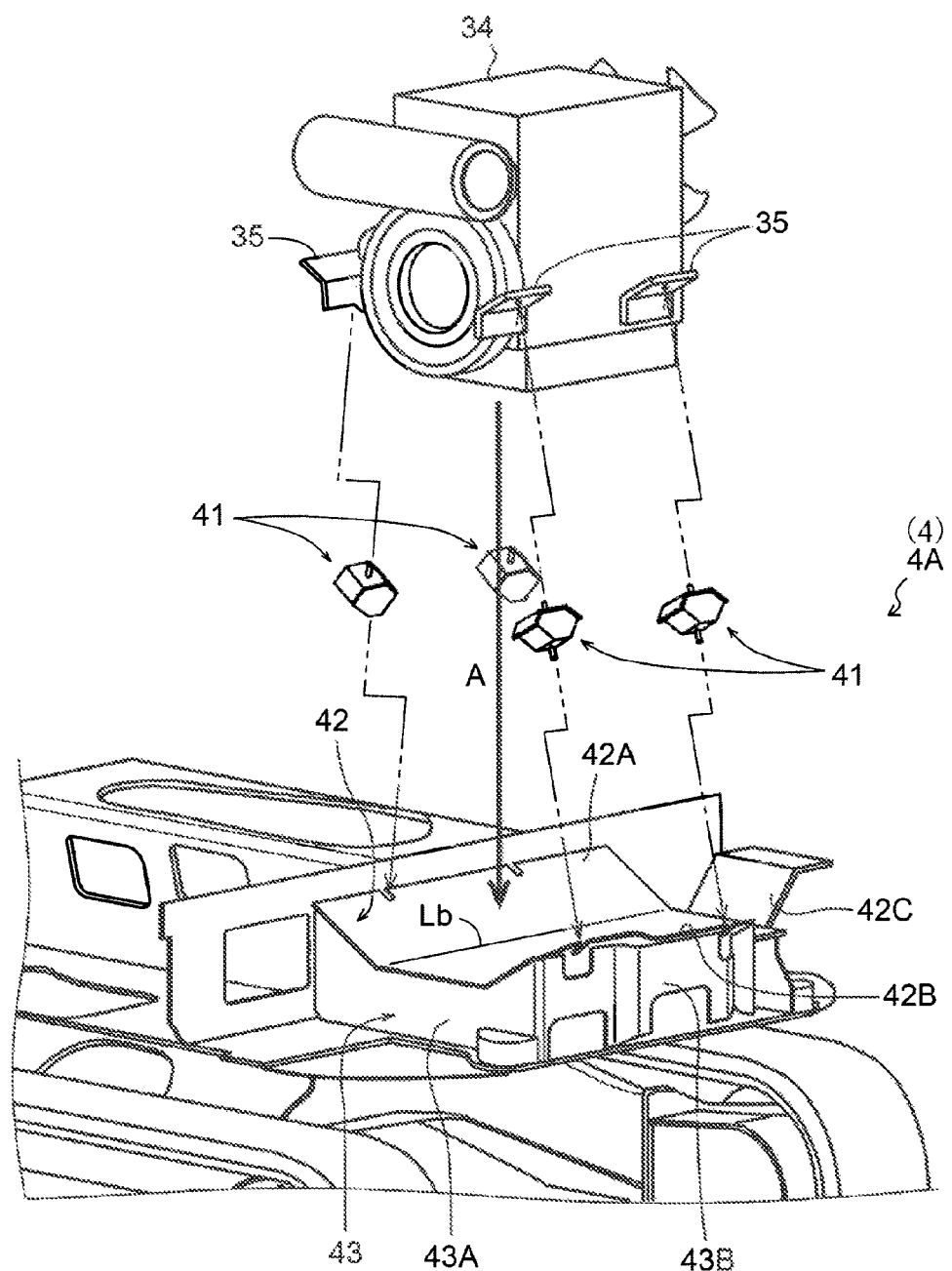
FIG. 4 is a diagram illustrating a process when an engine is mounted.

FIG. 2 is a diagram illustrating the engine supporting structure 4A according to the first embodiment of the present invention. FIG. 3 is an enlarged view of an area X of FIG. 2. Then, FIG. 4 is a diagram illustrating the process of mounting the engine 34. It is noted that an arrow F in FIG. 2 represents the advancing direction of the backhoe 100. Also, an arrow A illustrated FIG. 4 represents a mounting direction when the engine 34 is mounted. Further, a thin line Lb illustrated in FIG. 4 represents a bending line of a mount plate 42.

As is illustrated in FIG. 2, the engine supporting structure 4A is mainly constituted by an engine mount 41 and the mount plate 42.

As is illustrated in FIG. 3, the engine mount 41 is constituted by a vibration isolation rubber 41R and attaching bolts 41B. The engine mount 41 is fixed with the engine 34 on the top end side thereof and fixed with the mount plate 42 on the low end side thereof.

To be more specific, a bracket 35 is attached to the engine 34. The bracket 35 is formed in such a manner that a flange portion 35F protrudes from the engine 34 and that a bolt hole 35h is provided in the flange portion 35F. Also, in the mount plate 42, a notch 42n is provided at the end portion of the mount plate 42. Accordingly, the engine mount 41 is fixed in a state where the attaching bolt 41B on the top end side thereof is inserted into the bolt hole 35h of the bracket 35 and is fixed in a state where the attaching bolt 41B on the low end side thereof is fitted into the notch 42n of the mount plate 42. Regarding the engine supporting structure 4A, the engine 34 is supported with four sets of engine mounts 41.

As is illustrated in FIG. 4, the mount plate 42 is formed of a sheet of plate member to be bent. The anterior portion 42A and the posterior portion 42B of the mount plate 42 are bent at a predetermined angle, so that the mount plate 42 can support the engine mount 41 which is fixed and kept in an inclined state.

To be more specific, as is illustrated in FIG. 3, the flange 35F of the bracket 35 obliquely bulges out in such a manner as to keep a predetermined angle with respect to the horizontal direction. Accordingly, the engine mount 41 is fixed with the engine 34 in a state where the engine mount 41 is inclined in a predetermined direction. In contrast, as is illustrated in FIG. 4, the mount plate 42 is bent in such manner that the anterior portion 42A of the mount plate 42 is kept at a predetermined angle with respect to the horizontal direction. Also, the mount plate 42 is bent in such manner that the posterior portion 42B of the mount plate 42 is kept at a predetermined angle with respect to the horizontal direction. That is, the mount plate 42 is bent in such manner that the anterior portion 42A and the posterior portion 42B of the mount plate 42 are kept parallel to the flange portion 35F. Accordingly, the mount plate 42 can support the engine mount 41 that is fixed with the engine 34 and kept in the inclined state. In the engine supporting structure 4A, one piece of mount plate 42 supports four sets of engine mounts 41.

Thus, the engine supporting structure 4A includes one piece of mount plate 42 that supports a plurality of engine mounts 41. Then, the mount plate 42 is formed in accordance with the attaching angle of the engine mount 41.

Figure 10:
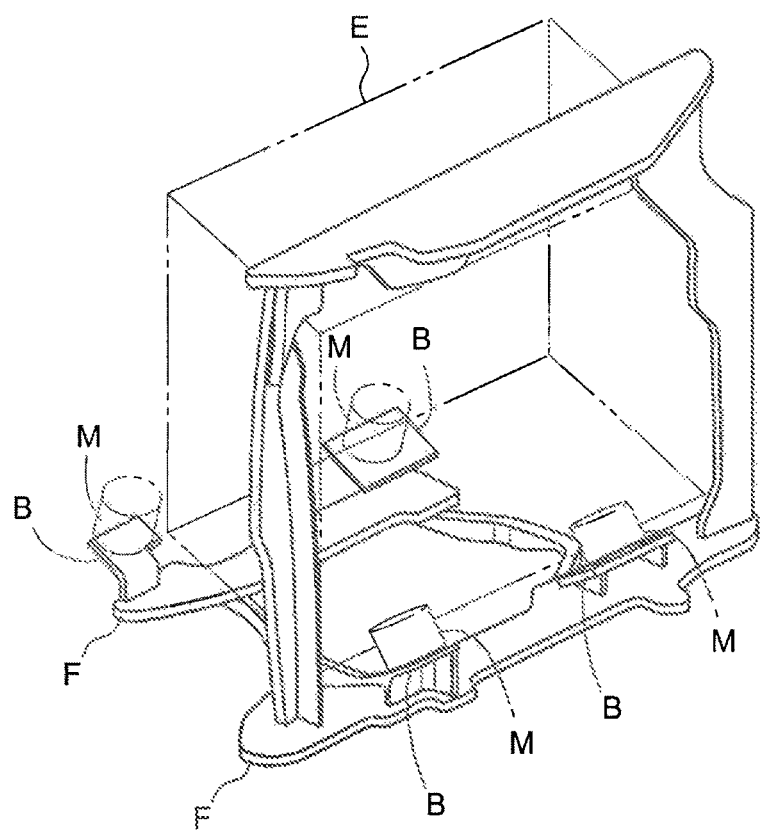
FIG. 10 is a diagram illustrating a conventional engine supporting structure.

As is described above, the engine supporting structure 4A obviate the necessity for a mount base B (see FIG. 10) in the conventional structure. Accordingly, the engine supporting structure 4A has a few welding portions and makes it unnecessary to carry out a welding operation with jigs, so that the simplification in the course of manufacturing process can be achieved. Further, the number of components is decreased, so that the reduction in costs can be achieved.

Further, the mount plate 42 according to the embodiment of the present invention is formed of a sheet of plate member to be bent in accordance with the attaching angle of the engine mount 41. Accordingly, the mount plate 42 can be manufactured by an engineering method including a press process. Consequently, the mount plate 42 can efficiently be manufactured according to the engine supporting structure 4A, thereby further achieving the reduction in costs.

Figure 8:
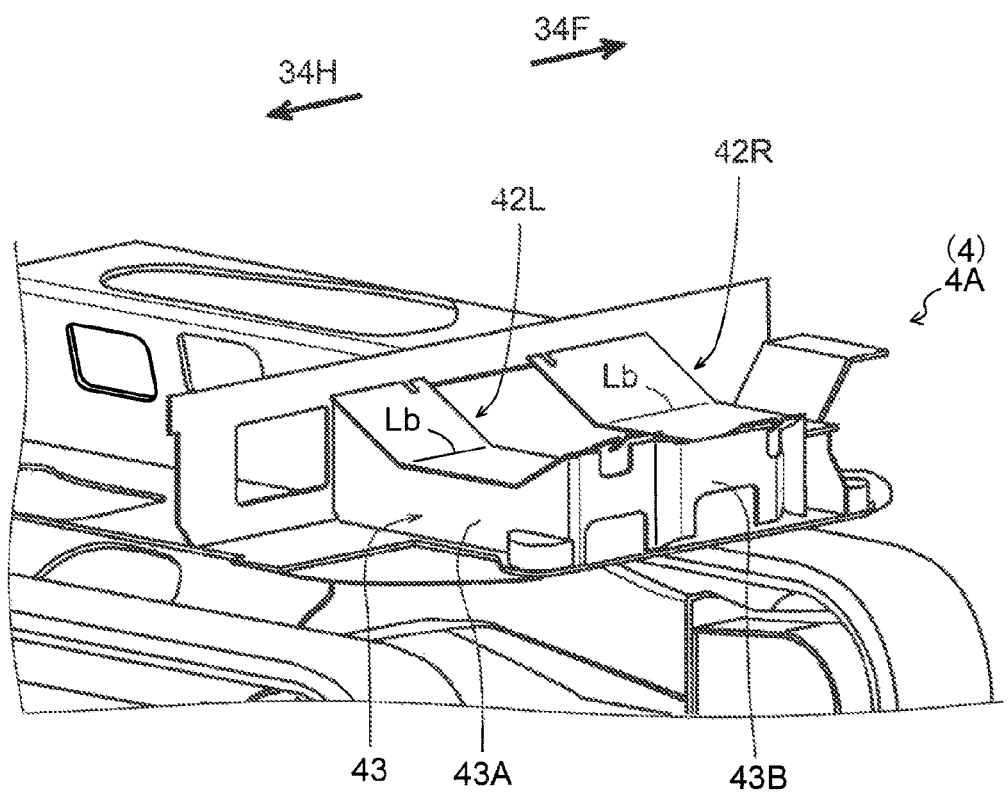
FIG. 8 is a diagram illustrating an engine supporting structure according to other embodiment.

With respect to the engine supporting structure 4A, a sheet of plate member is bent and formed into one piece of mount plate 42. However, a plurality of plate members may be bent and formed into a plurality of mount plates 42 (see FIG. 8). Specifically, a mount plate 42R to support two sets of engine mounts 41 on the side of a fan of the engine 34 (see an arrow 34F) and a mount plate 42L to support two sets of engine mounts 41 on the side of a flywheel (see an arrow 34H) may be formed. Further, these two sets of the mount plate 42R and the mount plate 42L may be combined so as to form one piece of mount plate 42.

Next, an engine supporting structure 4 (hereinafter referred to as "engine supporting structure 4B") according to the second embodiment of the present invention will be described in detail.

Figure 5:
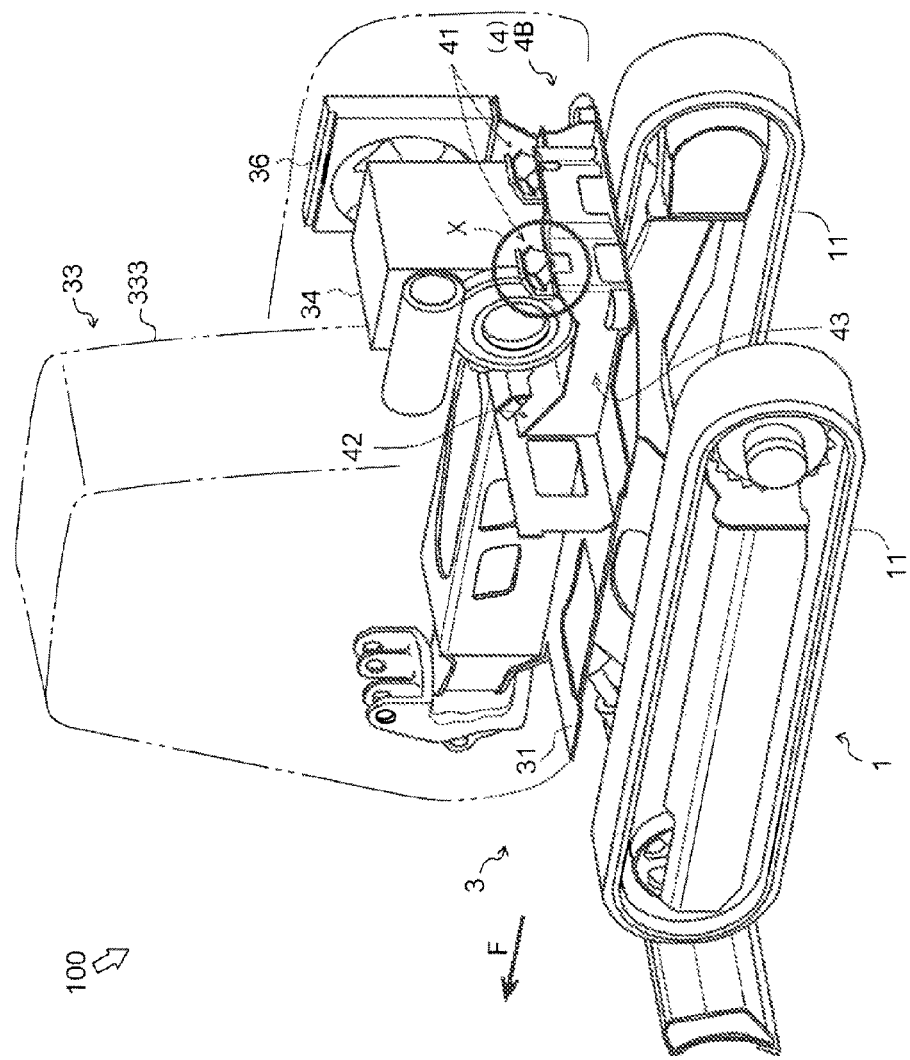
FIG. 5 is a diagram illustrating an engine supporting structure according to a second embodiment of the present invention.
Figure 6:
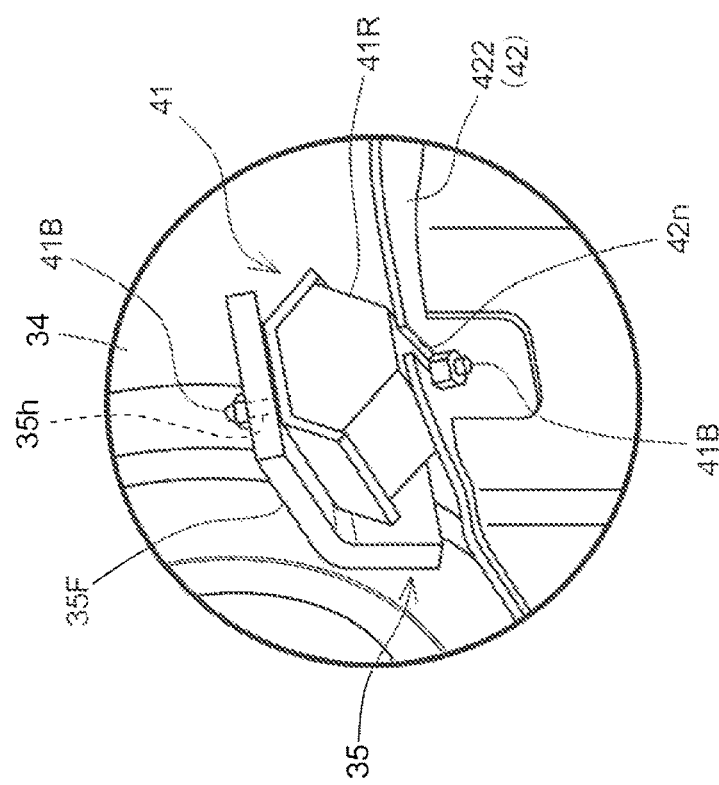
FIG. 6 is an enlarged view of an area X of FIG. 5.

FIG. 5 is a diagram illustrating the engine supporting structure 4B according to the second embodiment of the present invention. FIG. 6 is an enlarged view of an area X of FIG. 5.

Figure 7:
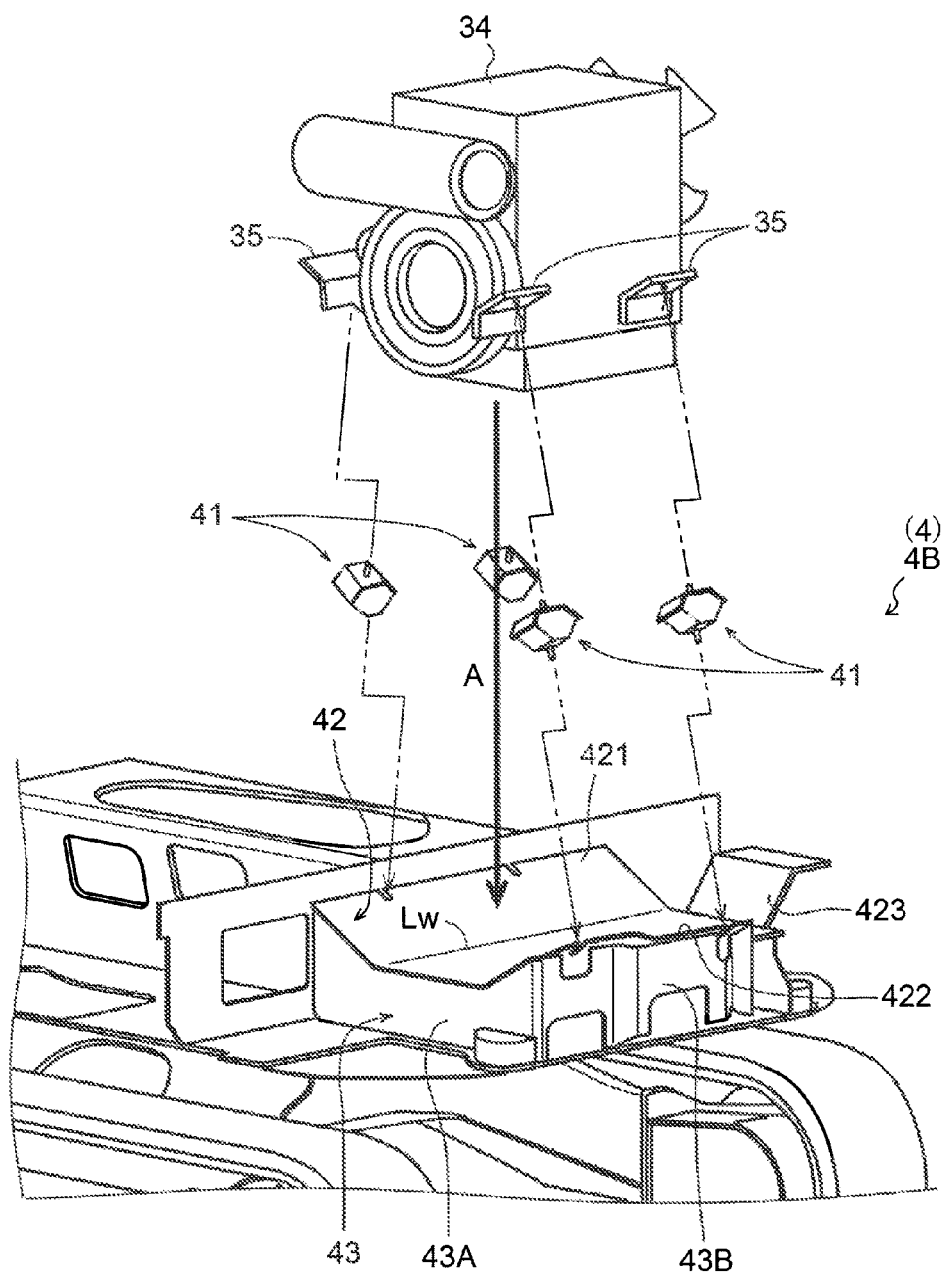
FIG. 7 is a diagram illustrating the process of mounting the engine.

Then, FIG. 7 is a diagram illustrating the process of mounting the engine 34. It is noted that an arrow F in FIG. 5 represents the advancing direction of the backhoe 100. Also, an arrow A illustrated FIG. 7 represents a mounting direction when the engine 34 is mounted. Further, a thin line Lw illustrated in FIG. 7 represents a welding line of a mount plate 42.

The engine supporting structure 4B is approximately similar to the engine supporting structure 4A according to the first embodiment of the present invention. Accordingly, the features that are different from those of the engine supporting structure 4A will be described below.

As is illustrated in FIG. 7, the mount plate 42 is formed of a plurality of plate members to be welded. Regarding the mount plate 42, a plate member 421 of the anterior portion thereof and a plate member 422 of the posterior portion thereof are welded in such a manner as to keep a predetermined angle, so that the mount plate 42 can support the engine mount 41, which is fixed and kept in the inclined state.

To be more specific, as is illustrated in FIG. 6, the flange 35F of the bracket 35 obliquely bulges out in such a manner as to keep a predetermined angle with respect to the horizontal direction. Accordingly, the engine mount 41 is fixed with the engine 34 in a state where the engine mount 41 is inclined in a predetermined direction. In contrast, as is illustrated in FIG. 7, the mount plate 42 is welded in such manner that the plate member 421 of the anterior portion of the mount plate 42 is kept at a predetermined angle with respect to the horizontal direction. Also, the mount plate 42 is welded in such manner that the plate member 422 of the posterior portion of the mount plate 42 is kept at a predetermined angle with respect to the horizontal direction. That is, the mount plate 42 is welded in such manner that the plate member 421 of the anterior portion thereof and the plate member 422 of the posterior portion thereof are kept parallel to the flange portion 35F. Accordingly, the mount plate 42 can support the engine mount 41 that is fixed with the engine 34 and kept in the inclined state. In the engine supporting structure 4B, one piece of mount plate 42 supports four sets of engine mounts 41.

Thus, the engine supporting structure 4B includes one piece of mount plate 42 that supports a plurality of engine mounts 41. Then, the mount plate 42 is formed in accordance with the attaching angle of the engine mount 41.

As is described above, the engine supporting structure 4B obviate the necessity for a mount base B (see FIG. 10) in the conventional structure. Accordingly, the engine supporting structure 4B has a few welding portions and makes it unnecessary to carry out a welding operation with jigs, so that the simplification in the course of manufacturing process can be achieved. Further, the number of components is decreased, so that the reduction in costs can be achieved.

Further, the mount plate 42 according to the embodiments of the present invention is formed of a plurality of plate members to be welded in accordance with the attaching angle of the engine mount 41. Accordingly, the mount plate 42 can be manufactured by an engineering method including a welding process. Consequently, the mount plate 42 can readily be manufactured according to the engine supporting structure 4B, thereby further achieving the reduction in costs.

Figure 9:
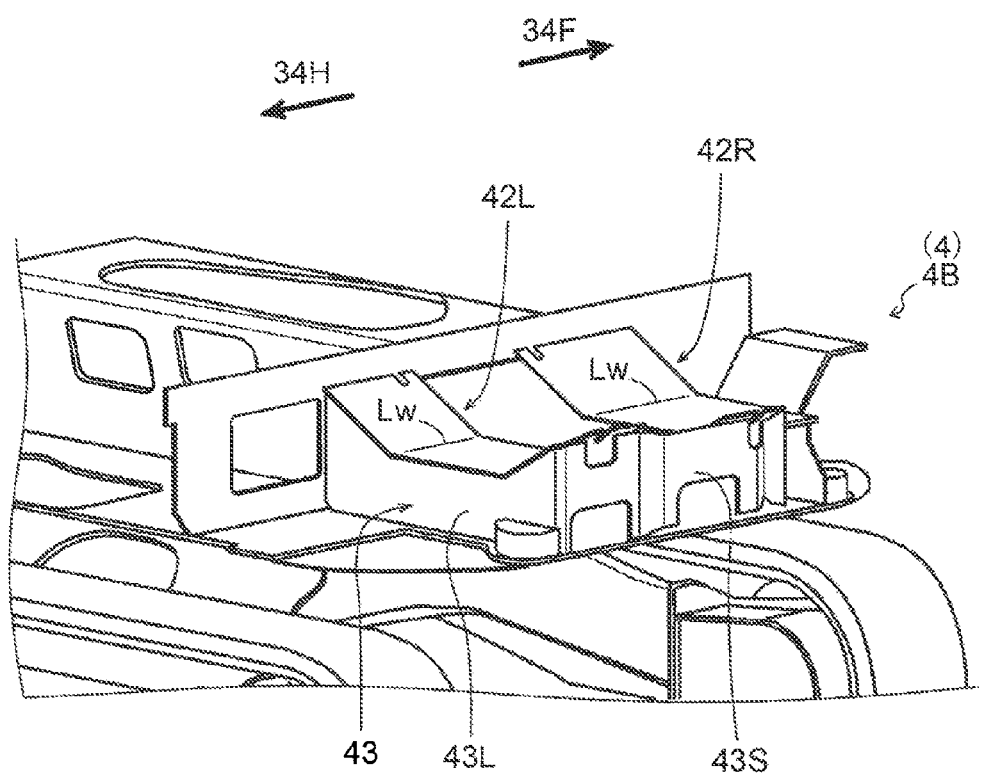
FIG. 9 is a diagram illustrating an engine supporting structure according to other embodiment.

With respect to the engine supporting structure 4B, the plurality of plate members are welded and formed into one piece of mount plate 42. However, the plurality of plate members may be welded and formed into a plurality of mount plates 42 (see FIG. 9). Specifically, a mount plate 42R to support two sets of engine mounts 41 on the side of the fan of the engine 34 (see an arrow 34F) and a mount plate 42L to support two sets of engine mounts 41 on the side of the flywheel (see an arrow 34H) may be formed. Further, these two sets of the mount plate 42R and the mount plate 42L may be combined so as to form one piece of mount plate 42.

Next, other features with regards to the engine supporting structure 4A and the engine supporting structure 4B will be described.

As is illustrated in FIGS. 2 to 9, the engine supporting structure 4A and the engine supporting structure 4B include a stand 43 of a skin-stressed sheet-metal body construction (monocoque construction). Herein, "skin-stressed sheet-metal body construction (monocoque construction)" is meant a construction in which rigidity is obtained by dispersing stress onto a wall surface.

In the embodiments of the present invention, the stand 43 is constituted by two pieces of vertical beams 43A and two pieces of horizontal beams 43B.

The two pieces of vertical beams 43A are disposed parallel to each other, which constitute the left surface and right surface of the stand 43. That is, the two pieces of vertical beams 43A are welded to the left-and-right end portions of the mount plate 42, which serves as a wall surface of the skin-stressed sheet-metal body construction (monocoque construction). Each vertical beam 43A is formed in accordance with the shape of the mount plate 42, thereby supporting the mount plate 42.

The two pieces of horizontal beams 43B are disposed parallel to each other, which constitute the anterior surface and posterior surface of the stand 43. That is, the two pieces of horizontal beams 43B are welded to the anterior and posterior end portions of the mount plate 42, which serves as the wall surface of the skin-stressed sheet-metal body construction (monocoque construction). Each horizontal beam 43B is formed in accordance with the shape of the mount plate 42, thereby supporting the mount plate 42.

Thus, according to the engine supporting structure 4A and the engine supporting structure 4B, the mount plate 42 is supported by the stand 43 of the skin-stressed sheet-metal body construction (monocoque construction). Accordingly, the wall surfaces of the stand 43 (vertical beams 43A and horizontal beams 43B) disperse the stress, so that the bending rigidity of the mount plate 42 can be improved.

Also, the stand 43 is attached to the rotation platform 31 constituting the rotation apparatus 3. The rotation apparatus 3 corresponds to a chassis in terms of another working vehicle, and the rotation platform 31 corresponds to a frame panel in terms of another working vehicle.

Thus, regarding the engine supporting structure 4A and the engine supporting structure 4B, the stand 43 is attached to the frame panel constituting the chassis. Accordingly, the wall surfaces of the stand 43 (vertical beams 43A and horizontal beams 43B) disperse the stress, so that the bending rigidity of the chassis can be improved.

Further, other features regarding the engine supporting structure 4A and the engine supporting structure 4B will be described.

As is illustrated in FIGS. 2 and 5, regarding the engine supporting structure 4A and the engine supporting structure 4B, a radiator 36 is supported by the mount plate 42.

To be more specific, regarding the engine supporting structure 4A, a portion 42C extended on the side of the mount plate 42 is bent at a predetermined angle, thereby supporting the radiator 36 at an appropriate position (see FIG. 2). Also, regarding the engine supporting structure 4B, the plate member 423 on the side of the mount plate 42 is welded in such a manner as to keep a predetermined angle, thereby supporting the radiator 36 at an appropriate position (see FIG. 5).

Thus, according to the engine supporting structure 4A and the engine supporting structure 4B, the radiator 36 can be supported, in addition to the engine 34. Consequently, this eliminates the structure to support the radiator 36 separately, so that the simplification of the manufacturing process and the reduction in costs can be achieved.

DESCRIPTION OF THE REFERENCE NUMERAL

100 Backhoe (Working vehicle)
1 Traveling apparatus
2 Working apparatus
3 Rotation apparatus
34 Engine
4 Engine supporting structure
4A Engine supporting structure
4B Engine supporting structure
41 Engine mount
42 Mount plate
43 Stand

What is claimed is:

1. An engine supporting structure for a working vehicle, the engine supporting structure configured to support an engine with a plurality of engine mounts, comprising:
   one piece of mount plate configured to support the plurality of engine mounts, wherein the mount plate comprises a left end portion, a right end portion, an anterior end portion, and a posterior end portion, and
   wherein the mount plate is supported by a stand having a skin-stressed sheet-metal body construction, surrounding with beams welded to the left and right end portions of the mount plate, and with beams welded to the anterior and posterior end portions of the mount plate.

2. The engine supporting structure for the working vehicle according to claim 1,
   a radiator configured to radiate heat of engine coolant, and
   wherein the mount plate supports the engine and the radiator.

* * * * *